United States Patent
Dalton et al.

(10) Patent No.: US 12,546,748 B2
(45) Date of Patent: Feb. 10, 2026

(54) TESTING OF SUBSTRATE MONOLITHS

(71) Applicant: JOHNSON MATTHEY PUBLIC LIMITED COMPANY, London (GB)

(72) Inventors: James Dalton, Royston (GB); Aswani Mogalicherla, Billingham (GB); Steve Pollington, Billingham (GB); Hugh Stitt, Billingham (GB)

(73) Assignee: Johnson Matthey Public Limited Company, London (GB)

( * ) Notice: Subject to any disclaimer, the term of this patent is extended or adjusted under 35 U.S.C. 154(b) by 299 days.

(21) Appl. No.: 18/354,665

(22) Filed: Jul. 19, 2023

(65) Prior Publication Data

US 2024/0036007 A1  Feb. 1, 2024

Related U.S. Application Data

(60) Provisional application No. 63/369,815, filed on Jul. 29, 2022.

(51) Int. Cl.
| | |
|---|---|
| *G01N 29/04* | (2006.01) |
| *G01N 29/12* | (2006.01) |
| *G01N 29/44* | (2006.01) |

(52) U.S. Cl.
CPC ........... *G01N 29/045* (2013.01); *G01N 29/12* (2013.01); *G01N 29/4436* (2013.01); *G01N 2291/0289* (2013.01); *G01N 2291/101* (2013.01)

(58) Field of Classification Search
CPC .. G01N 29/045; G01N 29/12; G01N 29/4436; G01N 2291/0289;
(Continued)

(56) References Cited

U.S. PATENT DOCUMENTS

| | | | |
|---|---|---|---|
| 5,285,687 A | * | 2/1994 | Ringel ................. G01N 29/045 73/12.14 |
| 11,433,352 B1 | | 9/2022 | Prabhu |
| 2020/0227242 A1 | | 7/2020 | Franklin |

FOREIGN PATENT DOCUMENTS

| | | | |
|---|---|---|---|
| EP | 3417936 A1 | | 12/2018 |
| JP | 2006250660 A | * | 9/2006 |

(Continued)

OTHER PUBLICATIONS

English translation for JP-2006250660-A (Year: 2006).*
(Continued)

*Primary Examiner* — Xin Y Zhong (57) ABSTRACT

A method of testing a substrate monolith (1), the substrate monolith (1) comprising:
  i) a plurality of channels extending longitudinally along a Z-axis of the substrate monolith (1); and
  ii) an array of walls extending along the Z-axis and forming partitions between adjacent channels;
wherein the array of walls comprises first walls (10) orientated parallel to a first-axis of the substrate monolith (1) and second walls (11) orientated parallel to a second-axis of the substrate monolith (1), the first-axis and the second-axis both being orthogonal to the Z-axis;
the method comprising the steps of:
  a) applying an impulse (J) to the substrate monolith (1) with an impact tool (22) to induce mechanical vibrations in the substrate monolith (1);
  b) sensing the mechanical vibrations of the substrate monolith (1);
  c) determining a fundamental frequency of the sensed mechanical vibrations; and
  d) comparing the fundamental frequency of the sensed mechanical vibrations to a fundamental frequency obtained from testing of a second substrate monolith;
(Continued)

wherein in step a) an impulse vector (30) of the impulse (J) has a non-zero first-axis component (31) and a non-zero second-axis component (32).

15 Claims, 10 Drawing Sheets

(58) Field of Classification Search
CPC .............. G01N 2291/101; G01N 29/46; F01N 2330/02; F01N 2330/06; F01N 2550/00; F01N 11/00; F01N 3/0222; G01M 17/00; G01M 7/08
See application file for complete search history.

(56) References Cited

FOREIGN PATENT DOCUMENTS

| | | | |
|---|---|---|---|
| JP | 2006334459 | A | 12/2006 |
| RU | 2646607 | C1 | 3/2018 |

OTHER PUBLICATIONS

Gulati, S.T. et al."Factors Affecting Severity of Oven Shock Test for Ceramic Substrates," SAE Technical Paper Series 2003-01-3074, ISSN: 0148-7191, e-ISSN: 2688-3627.

\* cited by examiner

TESTING OF SUBSTRATE MONOLITHS

The present disclosure relates to a method of testing substrate monoliths and a test apparatus for performing the method.

BACKGROUND TO THE DISCLOSURE

Substrate monoliths are used for the treatment of exhaust gases emitted from internal combustion engines, for example vehicular internal combustion engines. Substrate monoliths may treat the exhaust gases, for example, by filtering the exhaust gas to remove particulate matter and/or by using a catalyst to oxidise and/or reduce components of the exhaust gas such as carbon monoxide, unburned hydrocarbons and oxides of nitrogen.

Substrate monoliths may typically be formed from sintered metal, ceramic or metal fibres etc. The substrate monoliths are fragile due for example to their material composition and/or for example due to the presence of thin-walled structures that define the channels for gas flow within the substrate monolith. Substrate monoliths may therefore be prone to cracking when subjected to mechanical and/or thermal shocks. The manufacture of substrate monoliths necessarily involves mechanical manipulation of the substrate monoliths on a production line which may lead to imposition of mechanical loads on the substrate monolith, e.g. from accidents or when being transferred from one part of the production line to another. The manufacturing process also involves the application of thermal changes, e.g. when baking and cooling the bare substrate monolith and during calcination of the substrate monolith after application of a washcoat. Consequently, it would be desirable to test the substrate monoliths for the presence of cracks and/or other defects during or after manufacture before the substrate monoliths are despatched to a customer.

A problem with testing of substrate monoliths is that the cracks or other defects may be difficult to discern visually. External cracks (i.e. cracks propagating to/from an external surface of the substrate monolith) may be narrow, may be closed at rest, and/or may be difficult to discern under the lighting conditions typically present on a production line. Internal cracks within the body of the substrate monolith cannot easily be inspected visually, in particular by a human operator on a production line. Visual inspection in general is also time-consuming and therefore in practice can only be applied to a small sample percentage of the substrate monoliths that are produced.

It has been known for some human operators to tap a substrate monolith with their fingers to attempt to discern the presence of defects by listening for a 'dull' response. However, this technique requires a level of experience of the human operator and in addition the perception of sound varies from person to person. Thus, the conclusions from such 'tap' tests are very challenging to interpret and difficult to report to customers in an informative manner. Further, as with visual inspection, the method is time consuming and can only be applied to a small sample percentage of the substrate monoliths that are produced.

SUMMARY OF THE DISCLOSURE

In a first aspect the present disclosure provides a method of testing a substrate monolith, the substrate monolith comprising:

i) a plurality of channels extending longitudinally along a Z-axis of the substrate monolith; and ii) an array of walls extending along the Z-axis and forming partitions between adjacent channels;

wherein the array of walls comprises first walls orientated parallel to a first-axis of the substrate monolith and second walls orientated parallel to a second-axis of the substrate monolith, the first-axis and the second-axis both being orthogonal to the Z-axis;

the method comprising the steps of:

a) applying an impulse to the substrate monolith with an impact tool to induce mechanical vibrations in the substrate monolith;

b) sensing the mechanical vibrations of the substrate monolith;

c) determining a fundamental frequency of the sensed mechanical vibrations; and d) comparing the fundamental frequency of the sensed mechanical vibrations to a fundamental frequency obtained from testing of a second substrate monolith;

wherein in step a) an impulse vector of the impulse has a non-zero first-axis component and a non-zero second-axis component.

Advantageously, the fundamental frequencies obtained from the substrate monolith being tested and the second substrate monolith are used for the comparison. Using the fundamental frequencies may reduce or eliminate destructive interference from other frequencies.

The method may also be carried out very quickly, for example in under 5 seconds per substrate monolith. Advantageously, the method does not rely on human operator perception and is suitable for use on a production line. In particular, it has been surprisingly found that the method can be carried out despite the presence of relatively large amounts of background noise, as typically present in a factory production line setting.

Advantageously, the impulse vector of the impulse has a non-zero first-axis component and a non-zero second-axis component. Consequently, the impulse vector is not directly aligned with either the first walls or the second walls of the substrate monolith. This angling of the impulse vector has been found to produce a lower fundamental frequency in the sensed mechanical vibrations compared to an impulse vector applied that is aligned with the first walls or the second walls of the substrate monolith. In addition, the angling of the impulse vector has been found to produce a stronger signal amplitude for the fundamental frequency when used with substrate monoliths that is more easily discriminable from other resonances and background noise (including for example background noise from a factory setting).

In addition, a further advantage is that the stronger resonant response of the substrate monolith when the impulse vector is not directly aligned with either the first walls or the second walls means that the magnitude of the impulse can be reduced. This reduces the chance that the impact tool will damage the substrate monolith when applying the impulse.

Without wishing to be bound by theory, it is believed that the stronger and more discriminable resonant response of the substrate monolith when the impulse vector is not directly aligned with either the first walls or the second walls is due to the in-plane anisotropy of the substrate monolith. The first walls and second walls of the substrate monolith produce a 'honeycomb' network of cells in the plane that is orthogonal to the Z-axis. Typically in a substrate monolith the thickness of the first walls and the second walls (the cell walls) is smaller than the width of the cell opening. Taking the example of square-shaped cells, the plane of the substrate monolith orthogonal to the Z-axis may resemble a checkerboard pattern having a 2-D array of hollow square cells having centres aligned parallel to the first- and second-axes. This plane is anisotropic for stiffness—it has a different stiffness dependent on the direction of the applied force. In particular, in the example of square cells (assuming constant wall thickness for all walls) the stiffness parallel to each of the first walls and the second walls will be the same. However, the stiffness at 45° to the first and second walls of the square channels will be lower.

In preferred examples, in step a) the impulse vector has substantially equal first-axis and second-axis components. This may be particularly appropriate, for example, where the channel has substantially the same length dimension in each of the first-axis and the second-axis. One example would be square cells. Where the channels have other shapes the angling of the impulse vector may require adjustment. For example, where the channels are rectangular-shaped (non-square) or rhomboid-shaped the impulse vector may, for example, be angled to be parallel to a longest in-plane diagonal dimension of the channel.

In some examples, in step a) the impulse is applied by striking the substrate monolith in a diagonal direction with respect to the first-axis and the second-axis. In some examples, the first-axis and the second-axis are orthogonal to one another, being an X-axis and a Y-axis respectively of the substrate monolith. In such examples, in step a) the impulse may be applied by striking the substrate monolith in a direction at 45° to the X-axis and the Y-axis.

In some examples the plurality of channels comprise quadrilateral-shaped channels, optionally square-shaped channels.

In some examples the substrate monolith is supported on a support system to isolate the substrate monolith from extraneous vibrations.

In some examples the support system comprises a single support member. In some other examples the support system comprises a plurality of support members. In such examples the support members may number 3, 4 or more separate support members. The or each support member may comprise a flat support, a rounded support, a knife-edge support or a point support for contacting the surface, optionally a base, of the substrate monolith. In some examples the of each support member may comprise a rigid member. However, in other preferred examples the or each support member may comprise a soft or a resilient member. For example, the or each support member may be formed from a foam, e.g. a polyurethane foam, an elastomer, or a rubber.

In some examples the substrate monolith may be supported at one or more nodal points of the substrate monolith, preferably at one or more of the fundamental nodal points of the substrate monolith.

In some examples, in step b) sensing the mechanical vibrations of the substrate monolith comprises using a transducer to sense the mechanical vibrations in a time domain. In some examples the transducer may comprise a contact accelerometer that may be applied to a surface of the substrate monolith. However, in other preferred examples, a non-contact transducer may be used. For example, a microphone, optionally a unidirectional microphone, may be used to sense the mechanical vibrations by sensing the sound waves produced by the mechanical vibrations of the substrate monolith.

In some examples, in step c) determining the fundamental frequency comprises converting the sensed mechanical vibrations into a frequency domain to produce a frequency spectrum of the sensed mechanical vibrations. In such examples, in step c) determining the fundamental frequency may further comprise applying a Power Spectral Density (PSD) analysis to the frequency spectrum.

Advantageously, converting the sensed mechanical vibrations into the frequency domain can produce more reliable results for a wider range of substrate monoliths compared to a time domain analysis. For example, many substrate monoliths are highly porous and/or formed from ceramics that may contain many microcracks. This can lead to such substrate monoliths not producing a pure tone when impacted. As a result a time-domain analysis of the mechanical vibrations has been found to be difficult. According to the present method by converting into the frequency domain, this difficulty may be overcome.

The conversion into the frequency domain may, for example, be by use of a Fast Fourier Transformation algorithm. The use of a PSD analysis may advantageously reduce or eliminate ambiguity in determining the fundamental frequency from the frequency spectrum.

In some examples, the impact tool may be configured to apply a pre-determined impulse. The impact tool may be automated. For example, the impact tool may be computer-controller to improve the accuracy and reproducibility of the impulse, in particular in terms of its magnitude. In some examples the impact tool may be an automated hammer. In some examples the impact tool may comprise a metal or wooden head that contacts the substrate monolith in use. A wooden head may be preferable where the substrate monolith is particularly fragile. A metal head may be preferable where it is desired to obtain a greater signal intensity from the impact. As an example of a metal head, a stainless steel head can be used. Also, an alumina material has been found to be particularly effective for the head. It has been found that the material of the head does not change the fundamental frequency obtained but, as noted above, can affect the signal intensity.

The second monolith may comprise, for example, a reference substrate monolith, or a substrate monolith from a different batch of substrate monoliths compared to the substrate monolith, or may be a substrate monolith from the same batch of substrate monoliths as the substrate monolith.

For example, the second substrate monolith may be a reference substrate monolith and the method further may comprise the step of making a judgement regarding a crack status of the substrate monolith based on the comparison of the fundamental frequencies obtained for the substrate monolith and the reference substrate monolith.

Advantageously, the reference substrate monolith may be a substrate monolith that is known to be un-cracked, for example free of any substantial defect.

The comparison of the fundamental frequencies may comprise determining if there is a difference in the fundamental frequencies. Optionally, it may comprise determining if the difference exceeds a threshold amount. The threshold amount may be an absolute amount (e.g. a number of Hertz) or may be a relative amount (e.g. a percentage deviation in the frequency obtained for the substrate monolith compared to the reference substrate monolith).

The comparison of the fundamental frequencies may comprise determining a direction of shift of the fundamental frequency, e.g. whether the fundamental frequency obtained for the substrate monolith is greater than or less than that obtained for the reference substrate monolith.

For example, the substrate monolith and the second substrate monolith may be from respective first and second batches of substrate monoliths and the method may further comprise the step of making a judgement regarding a variance between the batches of substrate monoliths based on the comparison of the fundamental frequencies obtained for the substrate monolith and the second substrate monolith.

In making the determination, the fundamental frequencies obtained from one or more substrate monoliths from the first batch may be compared with the fundamental frequencies obtained from one or more substrate monoliths from the second batch. For example, each batch that is tested may comprise 3 or more, 5 or more, or 10 or more substrate monoliths that are tested.

The comparison of the fundamental frequencies may comprise determining if there is a statistically significant difference in the fundamental frequencies obtained for the substrate monoliths of the first batch and those of the second batch.

For example, the substrate monolith and second substrate monolith may be from a single batch of substrate monoliths and the method may further comprise the step of making a judgement regarding a variance within the single batch of substrate monoliths based on the comparison of the fundamental frequencies obtained for the substrate monolith and the second substrate monolith.

In making the determination, the fundamental frequencies obtained from 3 or more, 5 or more, or 10 or more substrate monoliths of the single batch may be used.

The comparison of the fundamental frequencies may comprise determining if there is a statistically significant variation in the fundamental frequencies obtained for the substrate monoliths of the single batch.

In some examples, the method is performed on a production line configured to process a plurality of substrate monoliths.

The substrate monolith may be formed for example from sintered metal, ceramic or metal fibres etc. For example, the substrate monolith may be formed from cordierite, various forms of silicon carbide or aluminium titanate.

The substrate monolith may be a "bare" substrate monolith or alternatively may comprise a composition (known as a washcoat) that coats the porous structure of the substrate monolith. The washcoat may be a catalytic washcoat to produce a catalysed substrate monolith having a catalytic function ability, for example oxidation, NOx-trapping, or selective catalytic reduction activity. The catalytic washcoat may comprise a catalyst, selected from the group consisting of a hydrocarbon trap, a three-way catalyst (TWC), a NOx absorber, an oxidation catalyst, e.g. a diesel oxidation catalyst (DOC), a selective catalytic reduction (SCR) catalyst, a lean NOx catalyst and combinations of any two or more thereof. The catalyst, for example the TWC, NOx absorber, oxidation catalyst, hydrocarbon trap and the lean NOx catalyst, may contain one or more platinum group metals, particularly those selected from the group consisting of platinum, palladium and rhodium.

In some examples the substrate monolith being tested may be a calcined substrate monolith. In such examples the substrate monolith and the reference substrate monolith have preferably been subjected to substantially the same calcination conditions.

The substrate monolith may comprise either a flow-through substrate monolith or a filter substrate monolith. In a flow-through substrate monolith a plurality of channels (also referred to as 'cells') extend longitudinally along the length (Z-axis) of the substrate monolith wherein the channels are open at both ends thereof. In a filter substrate monolith (also referred to as a 'wall-flow filter substrate monolith') a plurality of channels ('cells') extend longitudinally along the length (Z-axis) of the substrate monolith wherein channels at a first end of the substrate monolith that are open are blocked at the opposite end and channels that are open at the opposite end are blocked at the first end, the arrangement being such that every other adjacent channel has an open end (or a blocked end) on the first end of the filter substrate monolith and a blocked end (or an open end) on the opposite end thereof so that when an end of the filter substrate monolith is viewed it resembles a chess board of open and blocked channels. Fluid communication between the open channels at the first end of the filter substrate monolith and the open channels of the opposite end thereof is via the porous wall structure of the filter substrate monolith.

The external shape and dimensions of the substrate monolith, as well as properties such as the channel wall thickness and its porosity etc. may be varied depending on the intended application for the substrate monolith. The substrate monolith may be configured for use with an internal combustion engine (ICE) to filter an exhaust gas emitted by the internal combustion engine. The internal combustion engine may be a spark ignition engine, e.g. a gasoline ICE, or a compression ignition engine, e.g., a diesel ICE.

In a second aspect the present disclosure provides a test apparatus for performing the method of the first aspect, comprising:
  a support system for isolating the substrate monolith from extraneous vibrations;
  an impact tool;
  a transducer for sensing mechanical vibrations of the substrate monolith; and
  an analyser for determining the fundamental frequency of the sensed mechanical vibrations;
  wherein the impact tool comprises an automated hammer configured to apply the impulse to the substrate monolith with an impulse vector having a non-zero first-axis component and a non-zero second-axis component.

In some examples, the support system and the impact tool are both coupled to an alignment frame configured to ensure that the impulse vector of the impulse applied by the impact tool to the substrate monolith supported by the support system has the non-zero first-axis component and the non-zero second-axis component.

BRIEF DESCRIPTION OF THE DRAWINGS

Aspects and embodiments of the present disclosure will now be described, by way of example only, with reference to the accompanying drawings, in which.

DETAILED DESCRIPTION

The skilled reader will recognise that one or more features of one aspect or embodiment of the present disclosure may be combined with one or more features of any other aspect or embodiment of the present disclosure unless the immediate context teaches otherwise.

Figure 1:
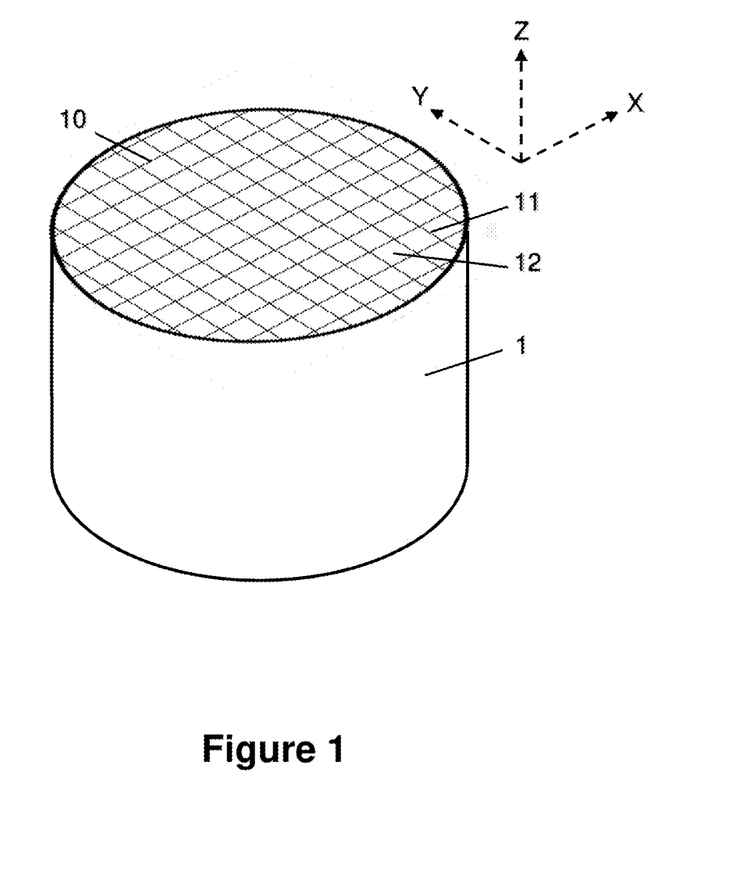
FIG. 1 is a schematic view of a substrate monolith.

FIG. 1 is a schematic view of a substrate monolith 1. The substrate monolith 1 comprises a plurality of channels extending longitudinally along a Z-axis of the substrate monolith 1 and an array of walls 10, 11 extending along the Z-axis that form partitions between adjacent channels.

The array of walls comprises first walls 10 orientated parallel to a first-axis of the substrate monolith 1 and second walls 11 orientated parallel to a second-axis of the substrate monolith 1, the first-axis and the second-axis both being orthogonal to the Z-axis. The first-axis and the second-axis may be orthogonal to one another. The first-axis may be an X-axis and the second-axis may be a Y-axis respectively of the substrate monolith 1.

The first walls 10 and the second walls may 11 define 'cells' 12 when viewed in the X-Y plane of the substrate monolith 1. In the illustrated example the cells 12 are square-shaped. However, the cells 12 may take other shapes. The substrate monolith 1 may have a cylindrical external shape, although other shapes can be provided.

According to the present disclosure the method of testing the substrate monolith 1 comprises the steps of:
 a) applying an impulse J to the substrate monolith 1 with an impact tool 22 to induce mechanical vibrations in the substrate monolith 1;
 b) sensing the mechanical vibrations of the substrate monolith 1;
 c) determining a fundamental frequency of the sensed mechanical vibrations; and
 d) comparing the fundamental frequency of the sensed mechanical vibrations to a fundamental frequency obtained from testing of a second substrate monolith; wherein in step a) an impulse vector 30 of the impulse J has a non-zero first-axis component 31 and a non-zero second-axis component 32.

Figure 2:
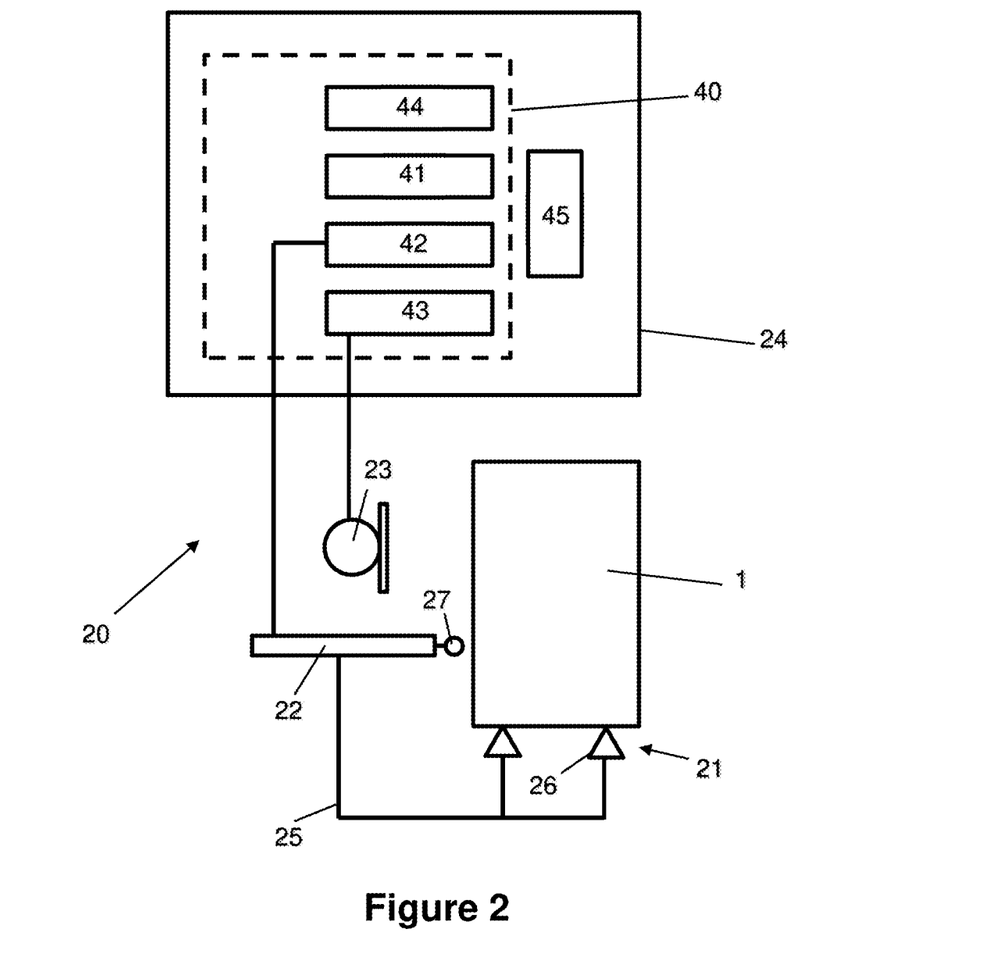
FIG. 2 is a schematic drawing of a test apparatus.

FIG. 2 shows a schematic drawing of a test apparatus 20 that is suitable for performing the test on the substrate monolith 1. The test apparatus 20 comprises a support system 21 for isolating the substrate monolith 1 from extraneous vibrations, the impact tool 22, a transducer 23 for sensing mechanical vibrations of the substrate monolith 1, and an analyser 24 for determining the fundamental frequency of the sensed mechanical vibrations.

The support system 21 and the impact tool 22 may both be coupled to an alignment frame 25 configured to ensure that the impulse vector 30 of the impulse J applied by the impact tool 22 to the substrate monolith 1 supported by the support system 21 has the non-zero first-axis component 31 and the non-zero second-axis component 32.

The support system 21 may comprise one or more support members 26. Each support member 26 may comprise an elastomer, foam or rubber member. In some preferred examples 3 or 4 support members 26 may be used that are positioned at one or more nodal points of the substrate monolith 1, preferably at one or more of the fundamental nodal points of the substrate monolith 1. For example, the support members 26 may contact a base of the substrate monolith 1 at points around a nodal circle of the substrate monolith 1. The nodal circle may be a circle whose diameter is approximately 68% of the substrate monolith's mean diameter in the case of cylindrical substrate monoliths. In some particularly preferred examples, 4 support members 26 may be used that are equi-spaced around the nodal circle, that is being angularly arranged with 90° separations there between.

The impact tool 22 may comprise, for example, an automated hammer configured to apply the impulse J to the substrate monolith 1 with the impulse vector 30 having the non-zero first-axis component 31 and the non-zero second-axis component 32. The impact tool 22 may be configured to apply a pre-determined impulse to the substrate monolith 1. The impact tool 22 may preferably be computer-controlled. In some examples the impact tool 22 may be an automated hammer. The impact tool 22 may comprise a metal or wooden head 27 that contacts the substrate monolith 1 in use.

The transducer 23 may comprise a contact or non-contact transducer. For example the transducer 23 may be an accelerometer that may be applied to a surface of the substrate monolith 1. In preferred examples, the transducer 23 may be a microphone, optionally a unidirectional microphone, may be used to sense the mechanical vibrations by sensing the sound waves produced by the mechanical vibrations of the substrate monolith 1.

The analyser 24 may comprise controller 40. The controller 40 may comprise one or more processors 41, an impact tool controller 42, a signal input 43 connected to the transducer 23, and a memory 44 for storage of, for example, software and data. Optionally the analyser 24 may further comprise an output, for example a display screen 45.

The one or more processors 41 may comprise analysis programming for analysing the sensed mechanical vibrations and converting the sensed mechanical vibrations into a frequency domain to produce a frequency spectrum of the sensed mechanical vibrations. For example the analysis programming may perform a Fast Fourier Transformation. The one or more processors 41 may further perform a Power Spectral Density (PSD) analysis on the frequency spectrum.

The one or more processors 41 may be provided in a single machine housing, or in a plurality of housings, and/or may be provided by distributed processing means, for example cloud-based processors.

Figure 3:
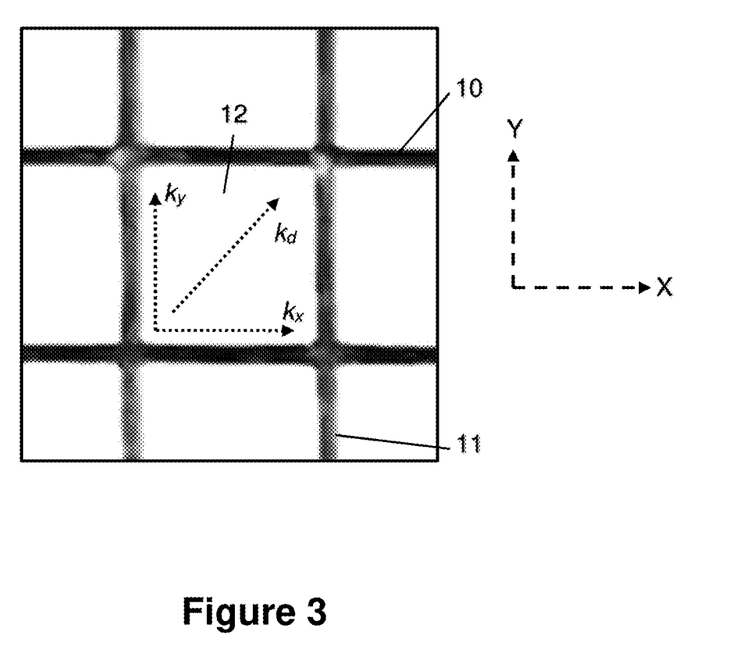
FIG. 3 is an end view of a portion of a substrate monolith.

FIG. 3 is an end view of a portion of the substrate monolith 1 illustrating one of the cells 12 defined in the X-Y plane by the first walls 10 (parallel to the X-axis) and the second walls 11 (parallel to the Y-axis). The stiffness of the substrate monolith 1 parallel to each of the first walls 10 and the second walls 11 is illustrated by the arrows $k_x$ and $k_y$. For a square-celled substrate monolith 1 typically $k_x=k_y$. However, the stiffness diagonally with respect to the first walls 10 and the second walls 11 (for example at 45°) of the square channels will be lower and is illustrated in FIG. 3 by arrow $k_d$.

Figure 4:
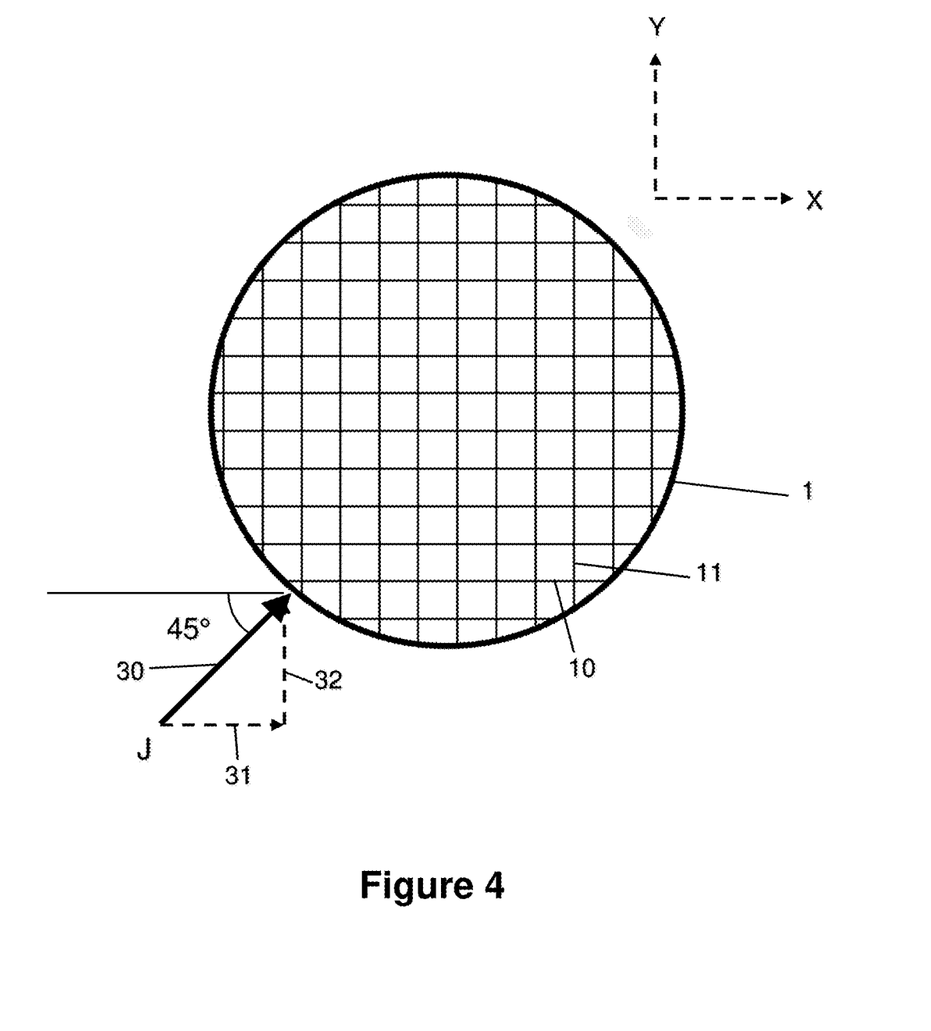
FIG. 4 is a schematic end view of a substrate monolith being subjected to an impulse.

As noted above, the impulse vector 30 of the impulse J has a non-zero first-axis component 31 and a non-zero second-axis component 32. In preferred examples, the impulse vector 30 may have substantially equal first-axis and second-axis components 31, 32. This is illustrated in FIG. 4 where the impulse J is applied by striking the substrate monolith 1 in a diagonal direction with respect to the first-axis (the X-axis) and the second-axis (the Y-axis). In the illustrated example the impulse J is applied by striking the substrate monolith 1 in a direction at 45° to the X-axis and the Y-axis.

Figure 5:
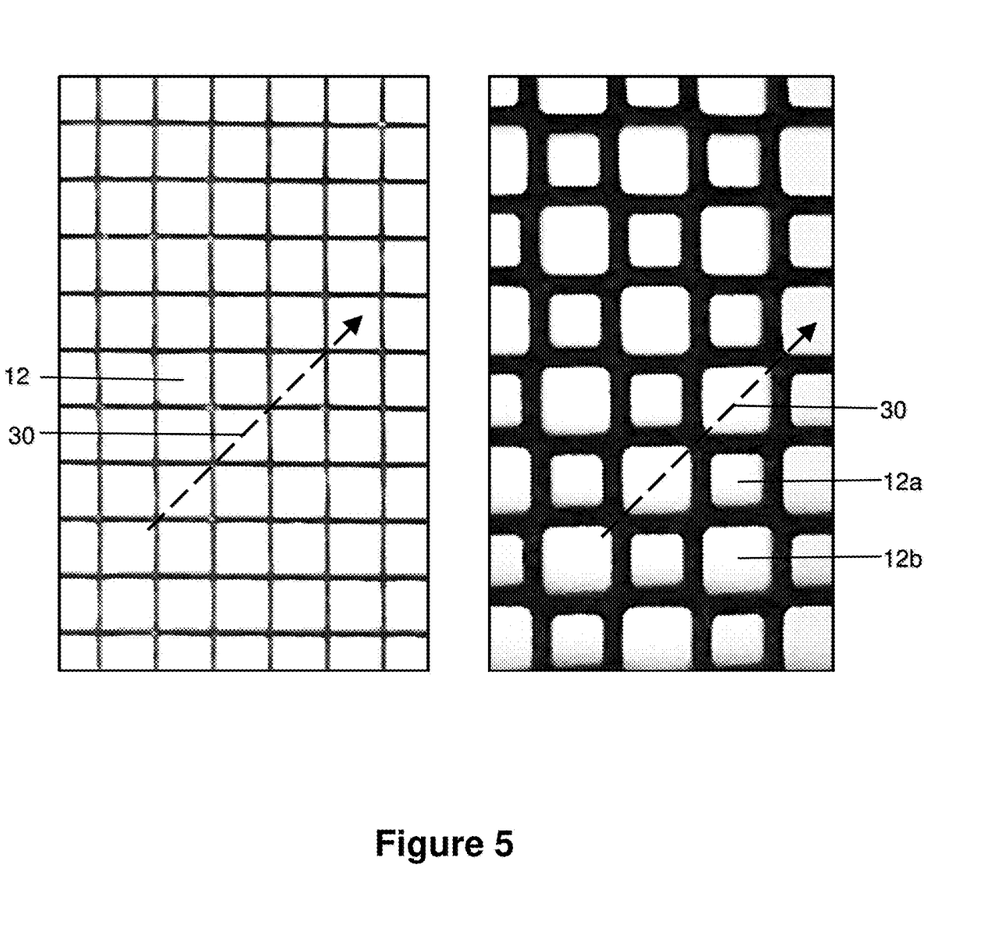
FIG. 5 shows end views of portions of two substrate monoliths.

FIG. 5 illustrates the angle of the impulse vector 30 for two examples of substrate monolith 1. The cells 12 of the left-hand example of FIG. 5 are uniform square-shaped cells. The cells 12 of the right-hand example of FIG. 5 are of varying size and shape, in a pattern referred to as 'octo-square'. In particular, the first walls 10 and the second walls 11 define smaller, square-shaped cells 12a and larger cells 12b. The larger cells 12b may have truncated corners forming octagon-shaped cells. However, for the purposes of the present disclosure it will be noted that in the case of the octagon-shaped cells 12b the sides of the cell 12b with the longest dimensions are those aligned parallel to the first-axis and the second-axis. Thus, the angle of the impulse vector 30 may be considered to extend diagonally relative to the octagon-shaped cells 12b as shown by the arrow in FIG. 5, in the same way as for the square-shaped cells 12a.

The second monolith may comprise, for example, a reference substrate monolith, or a substrate monolith from a different batch of substrate monoliths compared to the substrate monolith 1, or may be a substrate monolith from the same batch of substrate monoliths as the substrate monolith 1.

EXAMPLES

In the following examples substrate monoliths were tested using the method and testing apparatus as described above.

Example 1

A bare (uncoated) aluminium titanate filter substrate monolith having octo-square-shaped cells was used to study the effect of impact direction. The substrate monolith was impacted by the impact tool with two types of impact. In a first type of impact the impulse vector was aligned parallel to the first-axis so that it was at 0° to the first-axis walls of the substrate monolith (the 'Parallel direction'). In a second type of impact the impulse vector was aligned diagonally to the first-axis so that it was at 45° to the first-axis walls (and also the second-axis walls) of the substrate monolith (the 'Diagonal direction').

Figure 6:
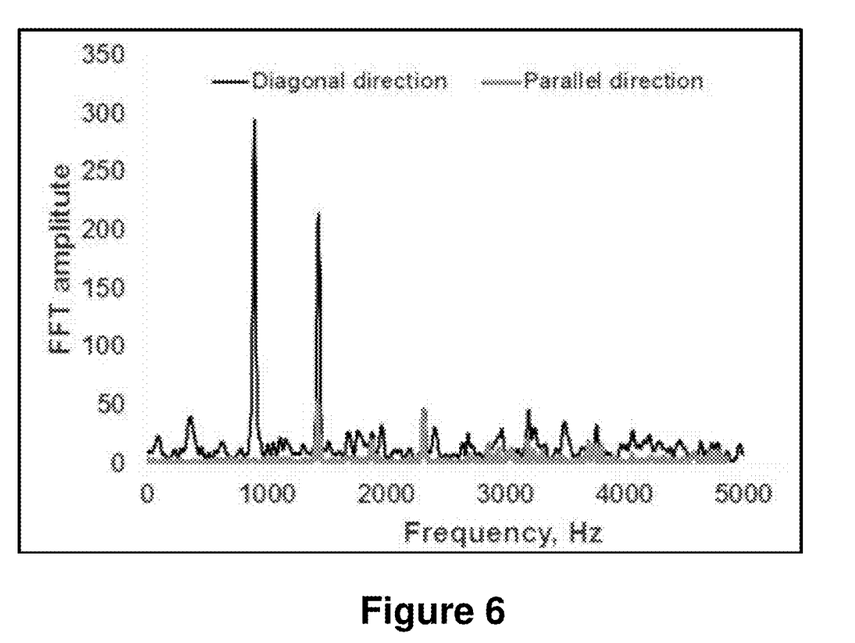
FIG. 6 is a graph of frequency vs. amplitude illustrating the effect of impulse direction.

FIG. 6 illustrates the frequency spectrums obtained from both types of impact using the test apparatus. In particular, during the test the mechanical vibrations sensed by the microphone were converted into the frequency domain to produce the frequency spectrum of the sensed mechanical vibrations. As can be seen, for the Parallel direction impacts the frequency spectrum does not comprise any single clear strongest fundamental frequency. By contrast, the Diagonal direction impacts produce a clearly discriminable fundamental frequency at around 1000 Hz that also has a greater amplitude compared to the Parallel direction impacts.

Example 2

Figure 7:
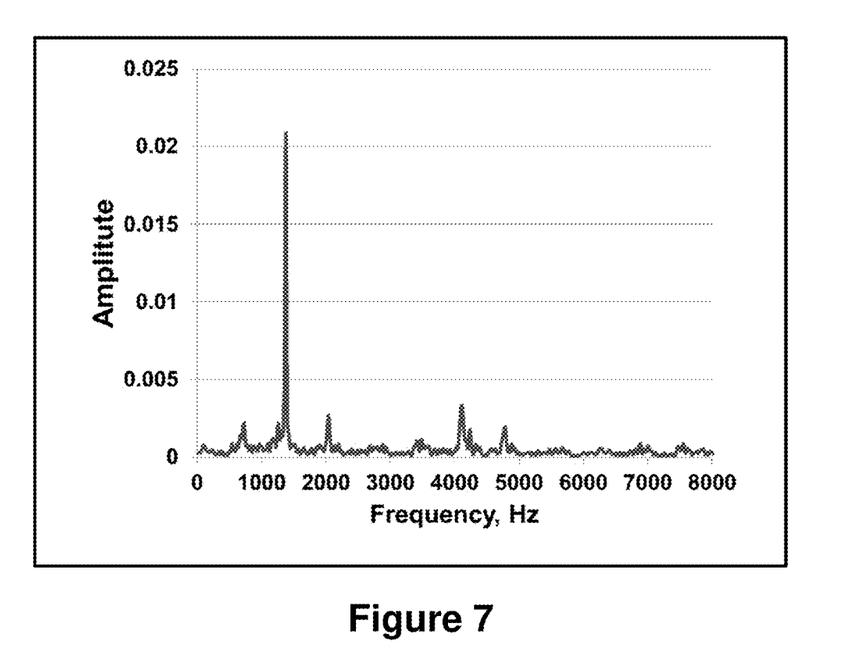
FIG. 7 is a graph of frequency vs. amplitude illustrating an example test result.

FIG. 7 illustrates another example frequency spectrum obtained from a flow-through substrate monolith using the test of the present disclosure. The flow-through substrate monolith was a cordierite substrate having square-shaped cells and was coated with a PGM/AL$_2$O$_3$ catalyst. In this example a single clearly discriminable fundamental frequency at around 1300 Hz was obtained using an impact angled at 45° to the first-axis walls.

Example 3

The second substrate monolith of the method may be used as a reference substrate monolith. The method may further comprise the step of making a judgement regarding a crack status of the substrate monolith based on the comparison of the fundamental frequencies obtained for the substrate monolith and the reference substrate monolith.

Figure 8:
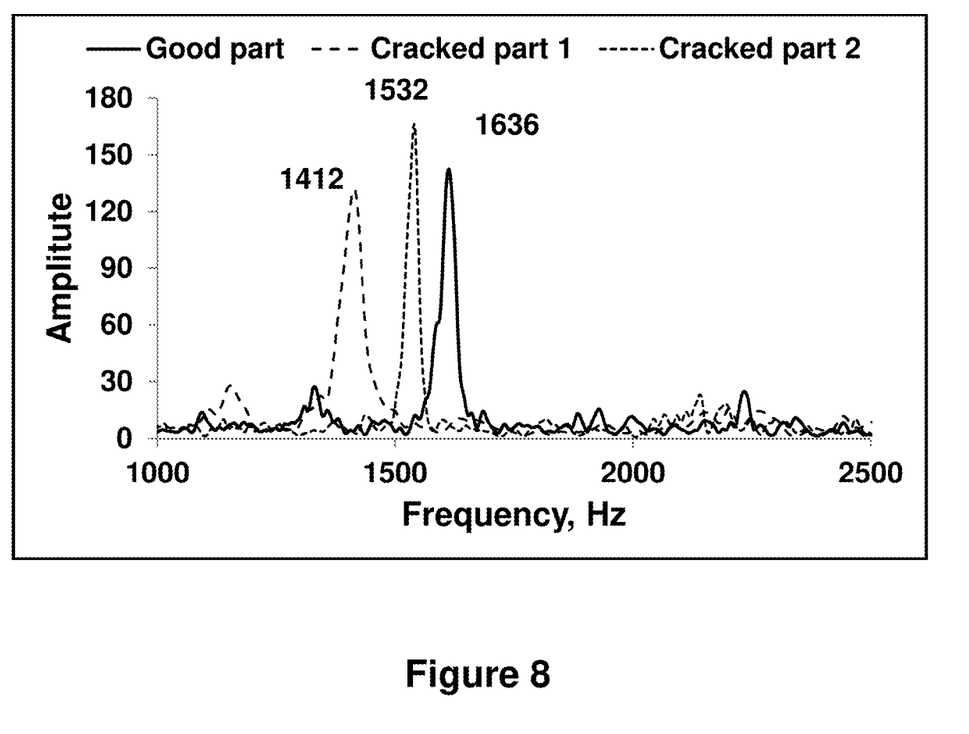
FIG. 8 is a graph of frequency vs. amplitude illustrating example test results for cracked and un-cracked substrate monoliths.

FIG. 8 illustrates results of three frequency spectrums obtained by the present method for three filter substrate monoliths. The filter substrate monoliths were aluminium titanate substrates having octo-square-shaped cells and being coated with CuO/zeolite—an un-cracked substrate monolith ('Good part') acting as the reference substrate monolith, a first cracked substrate monolith ('Cracked part 1') and a second cracked substrate monolith ('Cracked part 2'). Cracked part 1 and Cracked part 2 comprised washcoated and calcined substrate monoliths that were heated in an oven to 600° C. The over door was then opened to allow cold air to pass over the hot surfaces of the substrate monoliths. Due to the resulting thermal shock, surface cracking of the substrate monoliths was observed with cracks extending from 3 cm to 16 cm along the Z-axis and penetrating 1 to 5 cm in the radial direction.

As can be seen, the fundamental frequency obtained from the Good part (the reference substrate monolith) was 1636 Hz, compared to 1412 Hz and 1532 Hz respectively from the Cracked part 1 and Cracked part 2. The change in fundamental frequency (in this example a reduction) may be used to judge whether the tested substrate monolith has been cracked.

Example 4

As well as external cracks, the method may be used to discern whether a substrate monolith has internal cracks. Such internal cracks may develop, for example, when a substrate monolith is subjected to high cooling rates following calcination.

Figure 9:
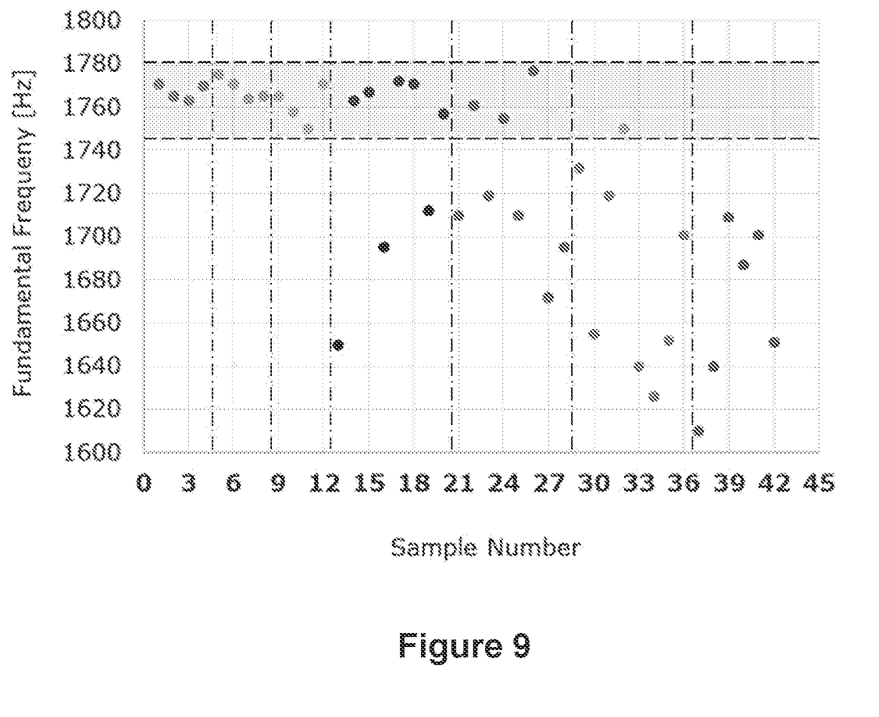
FIG. 9 is a plot of fundamental frequencies obtained for 42 samples of substrate monolith.

FIG. 9 illustrates the fundamental frequencies obtained from 42 samples of an SCRF filter substrate monolith. The filter substrate monoliths were aluminium titanate substrates having octo-square-shaped cells and being coated with CuO/zeolite. The samples were heated to a calcination temperature of 500° C. and then subjected to cooling rates varying between 3 and 9° C./min, as follows:

| Sample No. | Cooling rate (° C./min) |
|---|---|
| 1 to 4 | 3 |
| 5 to 8 | 4 |
| 9 to 12 | 5 |
| 13 to 20 | 6 |
| 21 to 28 | 7 |
| 29 to 36 | 8 |
| 37 to 42 | 9 |

There were no visible external cracks observable on any of the sample after cooling. However, testing according to the present disclosure was able to discern that cooling rates of greater than 5° C./min resulted in internal cracking— recognisable from the decrease in fundamental frequency obtained. As can be seen, at 6° C./min some samples suffered internal cracking. A clear trend of increasing occurrence of internal cracking with increasing cooling rate was observed until at a cooling rate of 9° C./min all samples tested had suffered internal cracking.

In this example the second substrate (reference substrate) may, for example, be chosen to be one that has been subjected to a slow cooling rate of less than or equal to 3°

C./min such that a 'reference' fundamental frequency of approximately 1770 Hz is obtained.

Example 5

The substrate monolith and the second substrate monolith may be from respective first and second batches of substrate monoliths. The method may further comprise the step of making a judgement regarding a variance between the batches of substrate monoliths based on the comparison of the fundamental frequencies obtained for the substrate monolith and the second substrate monolith.

Figure 10:
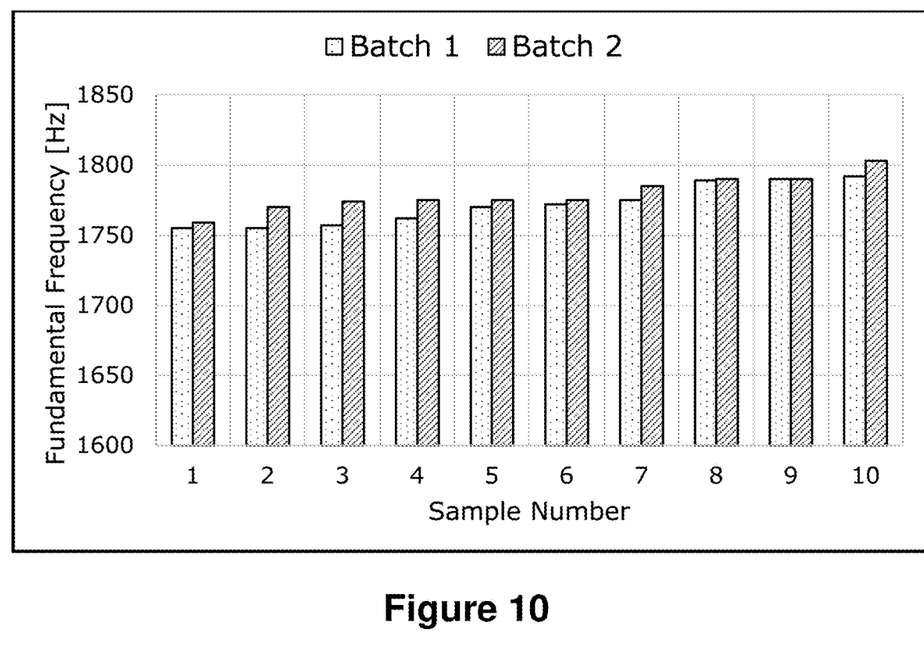
FIG. 10 is a plot of fundamental frequencies obtained for two batches, each containing 10 samples of substrate monolith.

FIG. 10 illustrates fundamental frequencies obtained from two batches of ten flow-through substrate monoliths. Each flow-through substrate monolith was a cordierite substrate having square-shaped cells and was coated with a PGM/$AL_2O_3$ catalyst. Both Batch 1 and Batch 2 had identical slurry compositions, washcoat loading, calcination temperature, etc. but were produced at different times. As can be seen from the results the fundamental frequencies appear generally consistent between batches. Further, statistical testing using a T test indicated that, for this example, the variance between the batches was not statistically significant.

Thus, the method may be used to make judgements between substrate monoliths manufactured at different times.

Example 6

Figure 11:
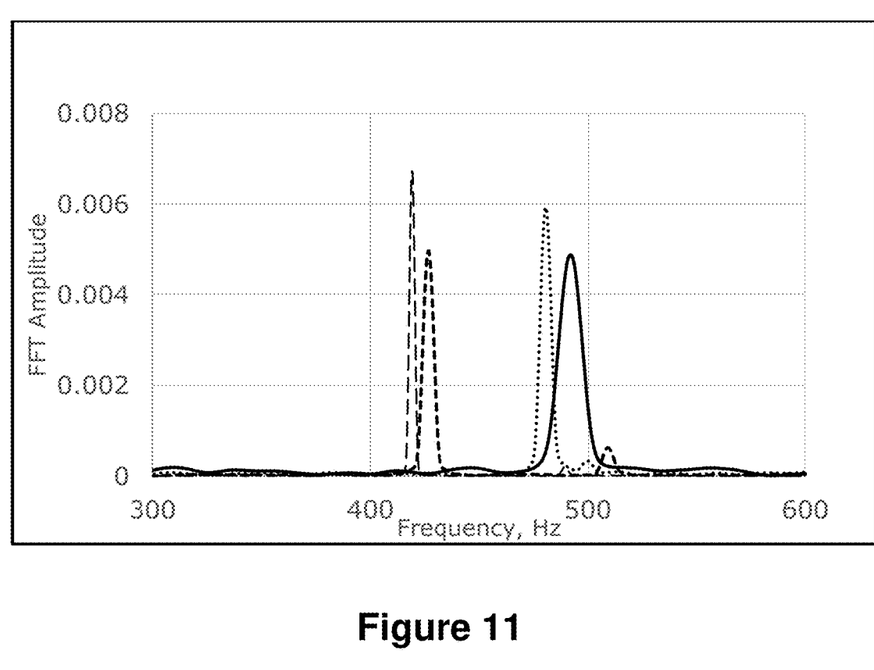
FIG. 11 is graph of frequency vs. amplitude illustrating example test results for substrate monoliths from four different sources.

FIG. 11 illustrates fundamental frequencies obtained from 4 different flow-through substrate monoliths that are comparable to each other in terms of their end use but are from 4 different manufacturers. Each substrate monolith was an uncoated cordierite substrate having square-shaped cells. In this case the second substrate monolith may be a previously selected substrate monolith. The other substrate monoliths may be potential replacement substrate monoliths that are being compared against the previously selected substrate monolith. As can be seen, in this example the previously selected substrate monolith produces a fundamental frequency of about 415 Hz. If the three potential replacements Option 1 has a similar fundamental frequency of about 425 Hz whereas Option 2 and Option 3 have fundamental frequencies of 485 and 492 Hz respectively.

Thus, the method may be used to make judgements between substrate monoliths obtained from different sources.

Example 7

The substrate monolith and the second substrate monolith may be from a single batch of substrate monoliths having the same configuration. The method may further comprise the step of making a judgement regarding a variance within the single batch of substrate monoliths based on the comparison of the fundamental frequencies obtained for the substrate monolith and the second substrate monolith.

Figure 12:
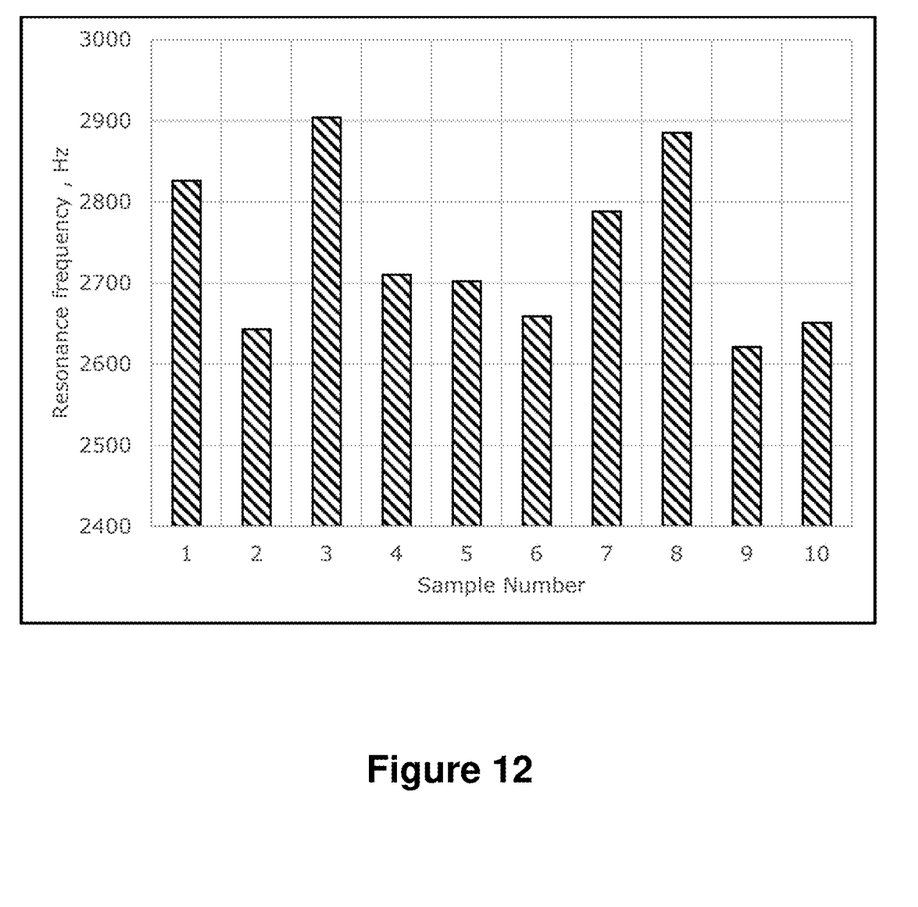
FIG. 12 is a plot of fundamental frequencies obtained for 10 samples of substrate monolith from a single batch.

In FIG. 12 a sample of 10 GPF filter substrate monoliths was tested. Each filter substrate monolith was an uncoated cordierite substrate having square-shaped cells. As can be seen the fundamental frequencies obtained varied from about 2620 Hz to 2905 Hz.

The comparison of the fundamental frequencies may comprise determining if there is a statistically significant variation in the fundamental frequencies obtained for the substrate monoliths of the single batch.

The invention claimed is:

1. A method of testing a substrate monolith, the substrate monolith comprising:
   i) a plurality of channels extending longitudinally along a Z-axis of the substrate monolith; and
   ii) an array of walls extending along the Z-axis and forming partitions between adjacent channels;
   wherein the array of walls comprises first walls orientated parallel to a first-axis of the substrate monolith and second walls orientated parallel to a second-axis of the substrate monolith, the first-axis and the second-axis both being orthogonal to the Z-axis;
   the method comprising the steps of:
   a) applying an impulse to the substrate monolith with an impact tool to induce mechanical vibrations in the substrate monolith;
   b) sensing the mechanical vibrations of the substrate monolith;
   c) determining a fundamental frequency of the sensed mechanical vibrations; and
   d) comparing the fundamental frequency of the sensed mechanical vibrations to a fundamental frequency obtained from testing of a second substrate monolith;
   wherein in step a) an impulse vector of the impulse has a non-zero first-axis component and a non-zero second-axis component; and
   wherein in step a) the impulse vector has substantially equal first-axis and second-axis components.

2. The method of claim 1, wherein in step a) the impulse is applied by striking the substrate monolith in a diagonal direction with respect to the first-axis and the second-axis.

3. The method of claim 1, wherein the first-axis and the second-axis are orthogonal to one another, being an X-axis and a Y-axis respectively of the substrate monolith.

4. The method of claim 3, wherein in step a) the impulse is applied by striking the substrate monolith in a direction at 45° to the X-axis and the Y-axis.

5. The method of claim 1, wherein the plurality of channels comprise quadrilateral-shaped channels, optionally square-shaped channels.

6. The method of claim 1, wherein the substrate monolith is supported on a support system to isolate the substrate monolith from extraneous vibrations.

7. The method of claim 1, wherein in step b) sensing the mechanical vibrations of the substrate monolith comprises using a transducer to sense the mechanical vibrations in a time domain.

8. The method of claim 1, wherein in step c) determining the fundamental frequency comprises converting the sensed mechanical vibrations into a frequency domain to produce a frequency spectrum of the sensed mechanical vibrations.

9. The method of claim 8, wherein in step c) determining the fundamental frequency comprises applying a Power Spectral Density (PSD) analysis to the frequency spectrum.

10. The method of claim 1, wherein the second substrate monolith is a reference substrate monolith and the method further comprises the step of making a judgement regarding a crack status of the substrate monolith based on the comparison of the fundamental frequencies obtained for the substrate monolith and the reference substrate monolith.

11. The method of claim 1, wherein the substrate monolith and the second substrate monolith are from respective first and second batches of substrate monoliths and the method further comprises the step of making a judgement regarding a variance between the batches of substrate monoliths based on the comparison of the fundamental frequencies obtained for the substrate monolith and the second substrate monolith.

12. The method of claim 1, wherein the method is performed on a production line configured to process a plurality of substrate monoliths.

13. The method of claim 1, wherein the substrate monolith comprises a flow-through substrate monolith or a filter substrate monolith.

14. A test apparatus for performing the method of any preceding claim, comprising:
   a support system for isolating the substrate monolith from extraneous vibrations;
   an impact tool;
   a transducer for sensing mechanical vibrations of the substrate monolith; and
   an analyser for determining the fundamental frequency of the sensed mechanical vibrations;
   wherein the impact tool comprises an automated hammer configured to apply the impulse to the substrate monolith with an impulse vector having substantially equal non-zero first-axis and second-axis components.

15. The test apparatus of claim 14, wherein the support system and the impact tool are both coupled to an alignment frame configured to ensure that the impulse vector of the impulse applied by the impact tool to the substrate monolith supported by the support system has the non-zero first-axis component and the non-zero second-axis component.

\* \* \* \* \*